US010730360B2

(12) United States Patent
Rathke et al.

(10) Patent No.: US 10,730,360 B2
(45) Date of Patent: Aug. 4, 2020

(54) METHOD OF CONTROLLING A HYDROPNEUMATIC SUSPENSION OF A VEHICLE CRANE

(71) Applicant: Terex Global GmbH, Schaffhausen (CH)

(72) Inventors: Hans-Joachim Rathke, Zweibrücken (DE); Mathieu Ragot, Bitche (FR)

(73) Assignee: Terex Global GmbH, Schaffhausen (CH)

( * ) Notice: Subject to any disclaimer, the term of this patent is extended or adjusted under 35 U.S.C. 154(b) by 82 days.

(21) Appl. No.: 15/998,768

(22) Filed: Aug. 16, 2018

(65) Prior Publication Data

US 2019/0168562 A1 Jun. 6, 2019

(30) Foreign Application Priority Data

Aug. 16, 2017 (DE) .......................... 10 2017 118 699

(51) Int. Cl.
*B60G 17/052* (2006.01)
*B60G 5/00* (2006.01)
(Continued)

(52) U.S. Cl.
CPC ............. *B60G 17/052* (2013.01); *B60G 5/00* (2013.01); *B60G 17/016* (2013.01); *B60G 17/017* (2013.01); *B60G 17/019* (2013.01); *B60G 17/033* (2013.01); *B60G 17/04* (2013.01); *B60G 17/056* (2013.01); *B66C 9/12* (2013.01);
(Continued)

(58) Field of Classification Search
None
See application file for complete search history.

(56) References Cited

U.S. PATENT DOCUMENTS 5,080,391 A * 1/1992 Kawabata ............ B60G 17/016
280/5.507
5,556,115 A * 9/1996 Heyring ............. B60G 17/0152
280/6.158
(Continued)

FOREIGN PATENT DOCUMENTS

DE 3546704 C2 7/1991
DE 19912898 C1 11/2000
(Continued)

*Primary Examiner* — Drew J Brown
(74) *Attorney, Agent, or Firm* — Gardner, Linn, Burkhart & Ondersma LLP (57) ABSTRACT

A method for controlling a hydropneumatic suspension of a mobile crane having at least four wheels that are each allocated a spring cylinder, having at least four spring circuits in which at least one spring cylinder is incorporated in each case, each spring circuit being allocated a pressure measurement sensor and a path measurement sensor, in which signals of the pressure measurement sensors and of the path measurement sensors are processed by a control unit, and the spring cylinders are actuated. To optimize control of a hydropneumatic suspension for road travel operation of the mobile crane the mobile crane is levelled using preset suspension height set values of the spring circuits, then, in the control unit, on the basis of pressures detected by pressure sensors, pressure set values are calculated per spring circuit and pressures in the spring circuits are readjusted with the aid of pressure set values.

11 Claims, 4 Drawing Sheets

(51) Int. Cl.
*B60G 17/017* (2006.01)
*B60G 17/056* (2006.01)
*B66C 23/36* (2006.01)
*B60G 17/04* (2006.01)
*B66C 9/12* (2006.01)
*B60G 17/016* (2006.01)
*B60G 17/019* (2006.01)
*B60G 17/033* (2006.01)
*B66C 23/42* (2006.01)

(52) U.S. Cl.
CPC .............. *B66C 23/36* (2013.01); *B66C 23/42* (2013.01); *B60G 2202/154* (2013.01); *B60G 2300/06* (2013.01); *B60G 2600/182* (2013.01); *B60G 2800/20* (2013.01)

(56) References Cited

U.S. PATENT DOCUMENTS

| | | | | |
|---|---|---|---|---|
| 2001/0044685 | A1* | 11/2001 | Schubert | B60G 17/0165 701/50 |
| 2013/0220110 | A1* | 8/2013 | Zhan | B60G 17/0165 91/459 |
| 2017/0361672 | A1* | 12/2017 | Ahmadian | B60G 11/27 |
| 2018/0148046 | A1* | 5/2018 | Macnamara | B60G 17/052 |
| 2019/0039431 | A1* | 2/2019 | Vaughan | B60G 17/0162 |

FOREIGN PATENT DOCUMENTS

| | | |
|---|---|---|
| DE | 20103735 U1 | 6/2001 |
| DE | 102010032046 B4 | 9/2016 |

* cited by examiner

METHOD OF CONTROLLING A HYDROPNEUMATIC SUSPENSION OF A VEHICLE CRANE

BACKGROUND OF THE INVENTION

The invention relates to a method for controlling a hydropneumatic suspension of a mobile crane having at least four wheels which are each allocated a spring cylinder, having at least four spring circuits in which at least one spring cylinder is incorporated in each case, each spring circuit being allocated a pressure measurement sensor and a path measurement sensor, in which the signals of the pressure measurement sensor and of the path measurement sensor are processed by a control unit and the spring cylinders are actuated.

A hydropneumatic axle suspension for a mobile crane is already known from the German patent DE 35 46 704 C2. In order to achieve smooth travel operation during use of the mobile crane as a wrecker crane it is proposed, in the region of the rear vehicle axles, which are more heavily loaded by the towing operation, to separate the hydraulic cylinders thereof from their hydraulic accumulators by lockable valves and therefore to lock the suspension of the rear vehicle axles. In the region of the front vehicle axles the opposite hydraulic cylinders of at least one front axle are connected to one another via associated valves and are therefore switched to oscillation. The hydraulic cylinders of at least one of the front axles are also connected to a hydraulic accumulator with softer spring characteristics compared to those at the rear axles.

In the utility model DE 201 03 735 U1, a further hydropneumatic axle suspension for heavy goods vehicles, in particular mobile cranes with at least two axles, is described. Each wheel is allocated a hydraulic cylinder and, in the case of more than two axles, the hydraulic cylinders of the wheels, which are each allocated to one of the four corners of the vehicle, are respectively combined as a group to form an individually actuatable spring circuit. The hydraulic cylinders of a spring circuit are connected to a hydraulic accumulator via filling and discharge lines with filling and discharge valves. In addition, in each case a hydraulic cylinder of the at least three spring circuits is fitted with a path measurement sensor. In one exemplified embodiment, a mobile crane with four spring circuits is described. If the hydraulic cylinder has a path measurement sensor then it also has electronics which amplify the measurement signal of the path measurement sensor or convert it into a digital signal and transmit it to a central electronic control unit. The electronic control unit preferably has an electronic controller with preset level variations for the vehicle body so that automatic lifting and lowering of the at least three corners of the vehicle can be effected prior to the start of the lifting operation. The filling and discharge valves to the hydraulic accumulators are then closed for the lifting operation. A suspension—as absolutely necessary in road traffic—is then shut off.

Furthermore, in DE 10 2010 032 046 B4, a method is described for adjusting the level of a pneumatically suspended motor vehicle. In a conventional manner, the pneumatic-suspension comprises, for each wheel of the motor vehicle, a spring system consisting of at least one air spring, a pressure sensor and/or a position sensor. In pneumatic suspensions there is a direct relationship between the level—spring travel or stroke of the spring cylinder and pressure of the spring cylinder. Therefore, there is a proportionality factor with which a spring path deviation can be converted into a pressure deviation, and also a height-dependent set pressure component. Nevertheless, very different pressures may be present and twist the chassis of the motor vehicle.

SUMMARY OF THE INVENTION

The present invention provides an optimised method for controlling a hydropneumatic suspension of a mobile crane.

In accordance with the invention, a method for controlling a hydropneumatic suspension of a mobile crane having at least four wheels which are each allocated a spring cylinder, having at least four spring circuits in which at least one spring cylinder is incorporated in each case, each spring circuit being allocated a pressure measurement sensor and a path measurement sensor, in which the signals of the pressure measurement sensors and of the path measurement sensors are processed by a control unit, and the spring cylinders are actuated, is optimised in that, for road travel operation of the mobile crane, the mobile crane is levelled using preset suspension height set values of the spring circuits, then, in the control unit, on the basis of the pressures detected by the pressure measurement sensors, pressure set values are calculated per spring circuit and the pressures in the spring circuits are readjusted with the aid of the pressure set values.

The invention therefore relates to wheel load optimisation at a preset level of the mobile crane. In a mobile crane with hydropneumatic suspension there is no relationship between the level or set level and the pressure in the spring cylinders or spring circuits.

All measured pressures together correspond to the weight and centre of gravity of the mobile crane. By means of the method in accordance with the invention these pressures are distributed in such a way that they correspond to the centre of gravity and cause no twisting in the chassis mobile crane without thereby changing the level. The change in pressure takes place in the usual manner by adding or draining oil from the respective spring system. The accumulator compensates for a certain quantity of oil—in each case in dependence upon the size of the accumulator—without markedly changing the level. Thus, prior to wheel load optimisation, the mobile crane is levelled to a desired suspension height, i.e., in the optimal case, the mobile crane stands on level horizontal ground and is itself positioned horizontally. On this precondition, the correct position of the centre of gravity can then be detected. If the mobile crane is not level, i.e. is inclined, the centre of gravity would be shifted in one direction.

Since a hydropneumatic suspension of a mobile crane with at least four spring circuits is mathematically undetermined, the mutual influence of the spring circuits during levelling, i.e. setting of a desired suspension height, in particular for travel operation on public roads, causes pressures to arise in the spring circuits, which bring about no optimal and also no uniform wheel load distribution to the wheels. This happens because of the mathematical indeterminateness which permits a large number of solutions. This distribution often takes place in a purely random manner so that an offset, i.e. an increase in the wheel loads can occur on diagonally opposite spring circuits. In a corresponding manner, in the case of the other diagonally opposite spring circuits, there is a reduction. This frequently results, in conjunction with the increase, in the maximum permissible wheel loads being exceeded, which can be an accident risk in road traffic. However, as a whole, the pressures thus arising almost randomly provide a proportional operand for the wheel loads of all wheels, the overall weight and also the position of the overall centre of gravity of the mobile crane. In knowledge of the position of the overall centre of gravity and of the overall weight, wheel loads, which are optimally distributed in terms of the present invention and have been rendered uniform, can then be calculated and are then processed in the form of pressure set values of the spring circuits. As a result therefore, a more uniform distribution of the loads to the individual wheels is achieved and therefore also overloading of individual wheels and associated accident risks are avoided. This is then associated with increased travel stability and increased travel safety of the mobile crane and also an improvement in the spring properties and braking properties of the mobile crane.

In terms of the present invention, a more uniform distribution is to be understood as an additional condition for the mathematically undetermined system. With this more uniform distribution an attempt is made to achieve the smallest possible difference between the forces present at every one of the wheels.

In order to level the mobile crane, in an advantageous manner, the suspension heights of the spring circuits detected by the path measurement sensors are regulated to the associated suspension height set values of the spring circuits.

In an advantageous manner, it is possible with the method to calculate, in the control unit and using the pressures of the spring circuits, the position of the overall centre of gravity and the overall weight of the mobile crane.

In knowledge of the position of the overall centre of gravity and of the overall weight of the mobile crane, the pressure set values of the spring circuits can then advantageously be calculated.

As a boundary condition for a clear solution to the mathematically undetermined system, in the control unit, the sum of the detected pressures of the spring circuits is distributed to the calculated pressure set values of the spring circuits.

In so doing, in an advantageous manner, it becomes possible to readjust the pressures in the spring circuits using the pressure set values with a tolerance of at most+/−4, preferably at most+/−2%.

In conjunction with the method in accordance with the invention, for travel operation of the mobile crane on public roads, suspension heights of the spring circuits detected by means of the path measurement sensors are regulated to a set value and then, in the control unit and on the basis of the pressure measurement sensors, the pressures of the spring circuits are detected.

An exemplified embodiment of the invention is explained in greater detail with reference to the following description.

DESCRIPTION OF THE PREFERRED EMBODIMENTS

Figure 1:
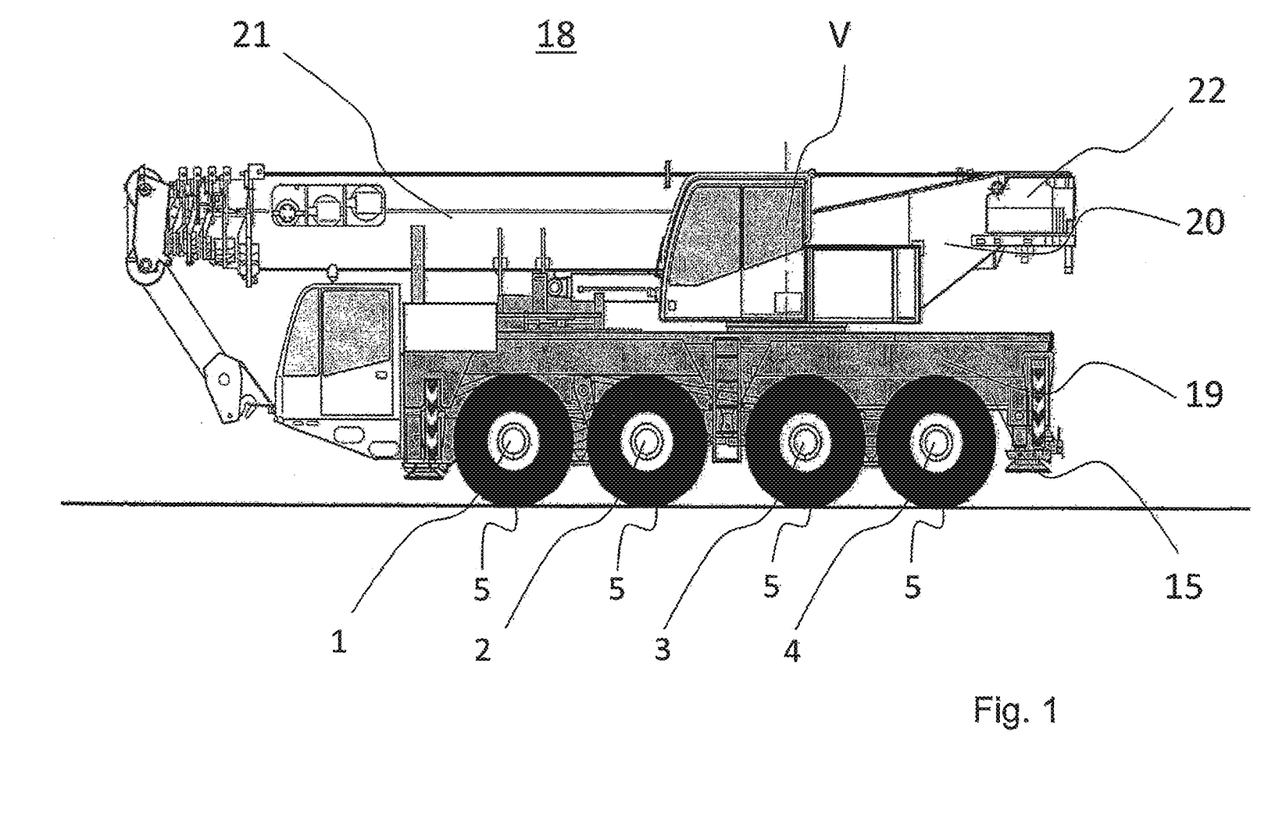
FIG. 1 shows a schematic illustration of a mobile crane with a telescopic jib and four axles.

The mobile crane 18 illustrated in FIG. 1 in schematic form is constructed in a conventional manner with a lower carriage 19 and an upper carriage 20. The upper carriage 20 is preferably pivotable about a vertical axis of rotation V relative to the lower carriage 19, has a telescopic and luffable jib 21 and a counterweight 22, of which only a part is shown. The lower carriage 19 has, in addition to driving and controlling components, a chassis frame 15 on which, in the present exemplified embodiment, eight (four illustrated) air-filled, rubber-tyred wheels 5 are mounted on four axles 1 to 4. The first and second axles 1, 2 form the front axles, the third and fourth axles 3, 4 form the rear axles of the mobile crane 18.

Figure 2:
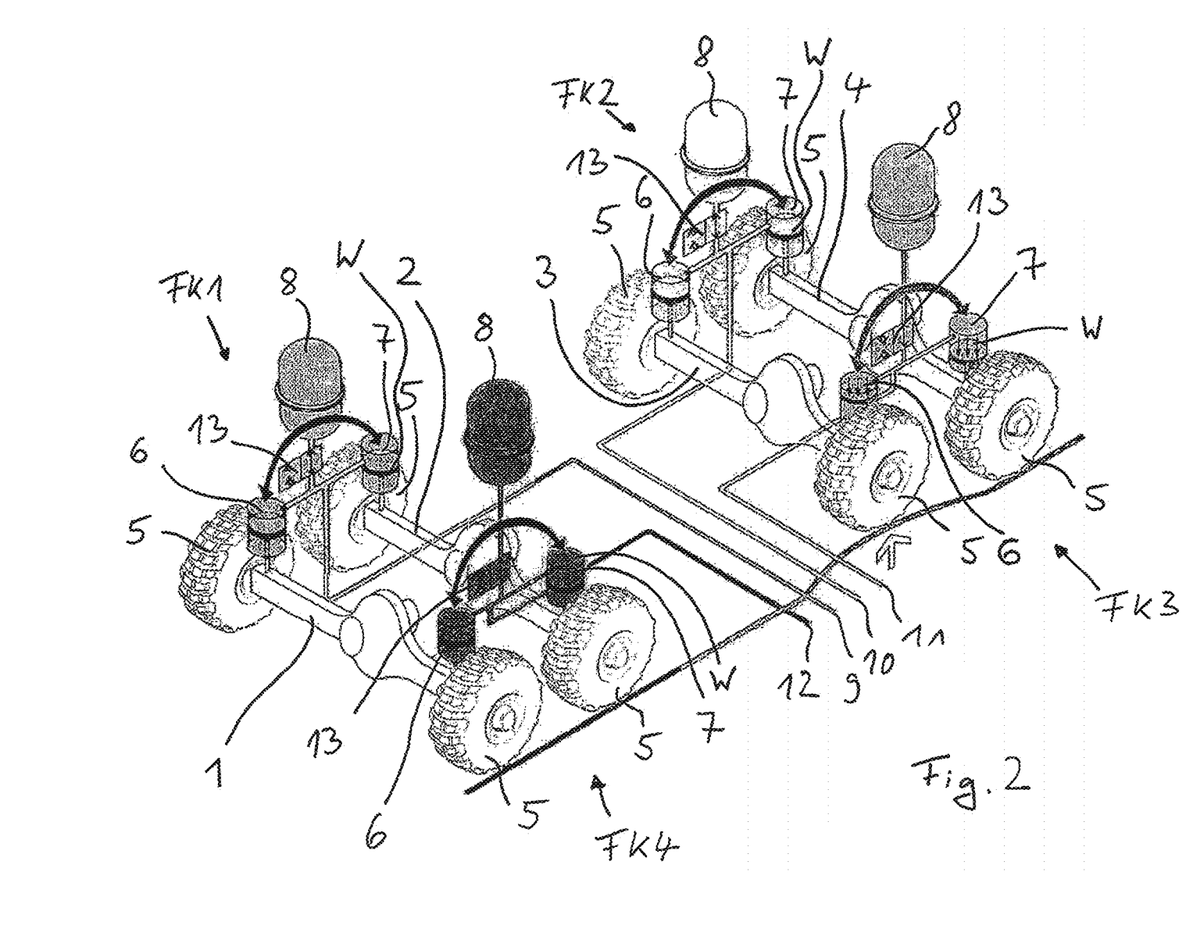
FIG. 2 shows a schematic illustration of a hydropneumatic suspension of the mobile crane in accordance with the invention from FIG. 1.

FIG. 2 illustrates in schematic form an exemplified embodiment of a hydropneumatic suspension in accordance with the invention of the mobile crane 18, able to travel on public roads, of FIG. 1, with optimal wheel load distribution. FIG. 2 shows the eight air-filled and rubber-tyred wheels 5 mounted on the four axles 1 to 4. Each wheel 5 on these axles 1 to 4 is allocated a spring cylinder 6, 7, formed as hydraulic cylinders, of the hydropneumatic suspension, which spring cylinder is articulated with its piston rod on the respective axle 1 to 4 and with its housing on the chassis frame 15, not illustrated. The resulting total of eight spring cylinders 6, 7 are combined in pairs to form spring circuits FK1 to FK4 corresponding to the four corners of the mobile crane 18. Each spring circuit FK1 to FK4 can be actuated and set independently of the other spring circuits FK1 to FK4 by a separate valve-controlled filling and discharge line 9, 10, 11, 12 for hydraulic fluid. In each spring circuit FK1 to FK4 of the mobile crane 18 is at least one gas or spring accumulator 8 which is connected via an accumulator valve 13, to the respective filling and discharge line 9, 10, 11, 12 and therefore to the cylinder chambers of the spring cylinders 6, 7. Depending on the position of the accumulator valve 13, the respective gas or spring accumulator 8 can be connected to the cylinder chambers of the spring cylinders 6, 7 or can be separated therefrom. The spring cylinders 7, of which each spring circuit FK1 to FK4 has one, is a hydraulic cylinder which is fitted with an electronic path measurement sensor W for measuring the level of the suspension height a (see FIG. 3). The remaining spring cylinders 6 are not fitted with path measurement sensors since a level measurement per spring circuit FK1 to FK4 is sufficient. Furthermore, the pressure of each spring circuit FK1 to FK4 is determined by means of a pressure measurement sensor D (see FIG. 3).

Figure 3:
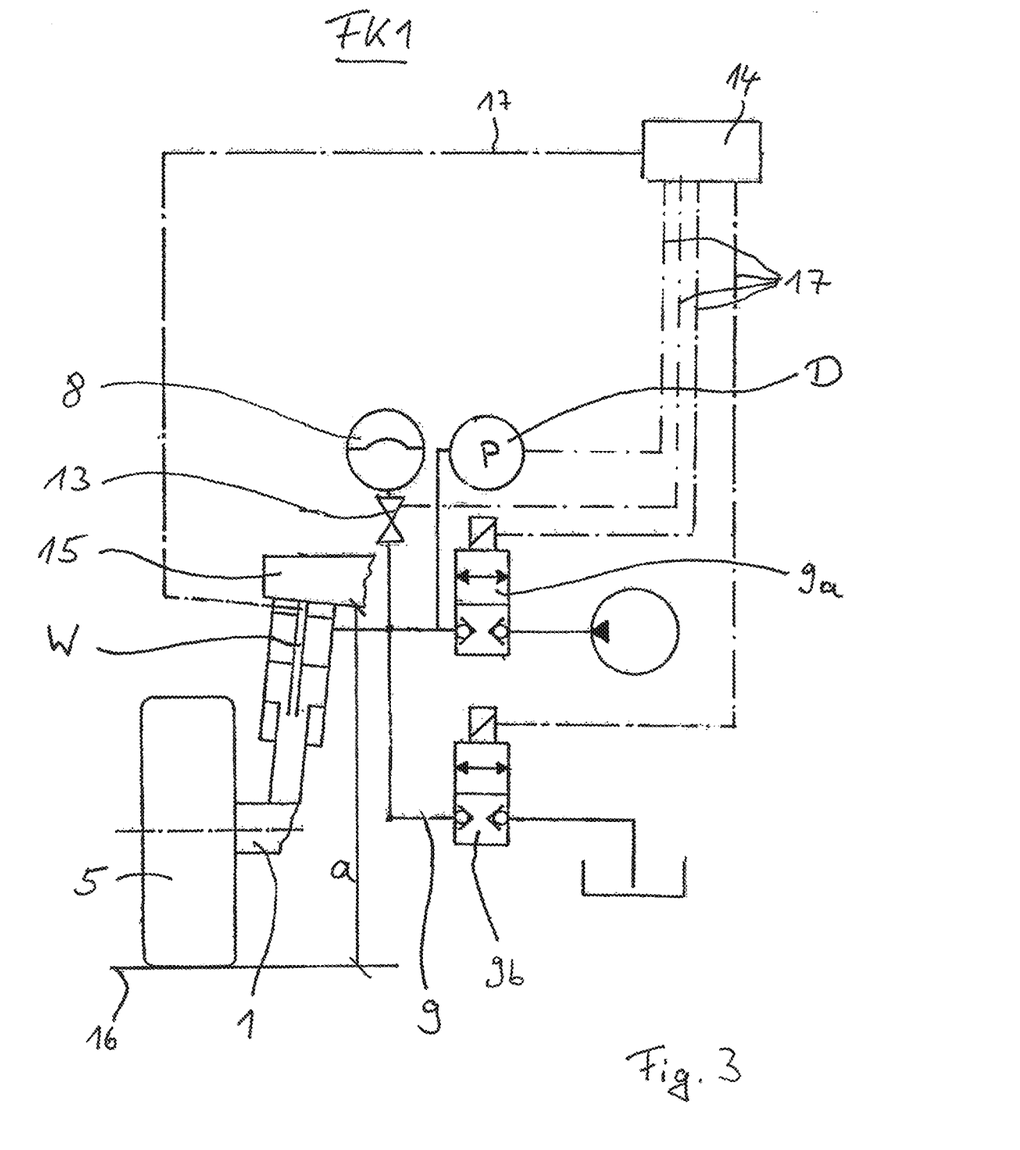
FIG. 3 shows a schematic illustration of a section of a hydraulic circuit diagram relating to one wheel.

FIG. 3 shows a schematic illustration of a section of a hydraulic circuit diagram of the hydropneumatic suspension relating to a wheel 5. The wheel 5 mounted on the first axle 1 is supported via the spring cylinder 7 with the path measurement sensor W on a chassis frame 15 of the lower carriage of a mobile crane 18. The path measurement sensor W is used to detect the extended position of the piston rod of the spring cylinder 7, or the suspension height a of the mobile crane 18 in terms of a distance between the ground 16 on which the wheels 5 rest and the chassis frame 15. The extended position of the piston rod of the spring cylinder 7 is controlled via the pressure in the filling and discharge line 9 and the associated filling valve 9a and discharge valve 9b. The pressure p in the filling and discharge line 9 is detected by the pressure measurement sensor D. The filling valve 9a, the discharge valve 9b, the accumulator valve 13, the pressure measurement sensor D and the path measurement sensor W are connected within each spring circuit FK1 to FK4 via control/signalling lines 17 in each case to a central control unit 14.

Figure 4:
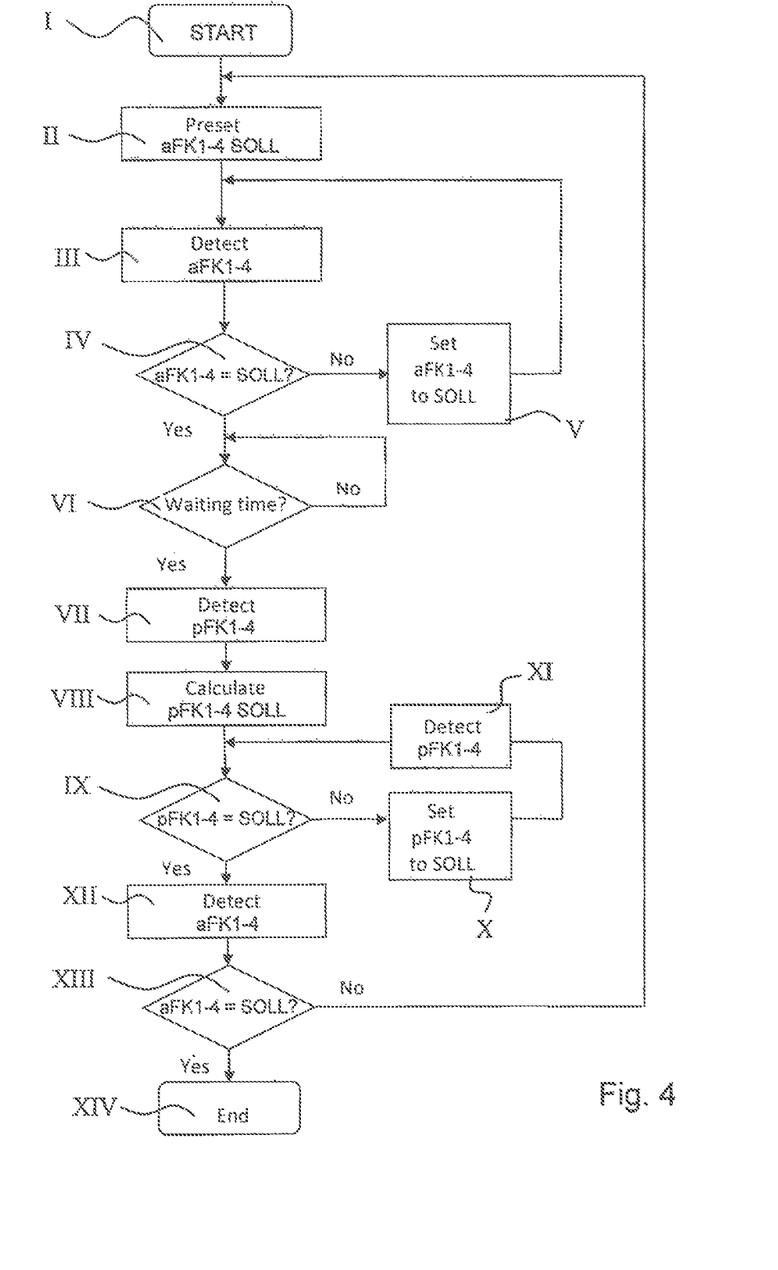
FIG. 4 shows a flow diagram of a method for controlling a hydropneumatic suspension of a mobile crane.

FIG. 4 shows a flow diagram of a method for automatically controlling a hydropneumatic suspension having optimal wheel load distribution for travel operation of the mobile crane 18 by means of the control unit 14.

The method comprises essentially the following steps:
levelling the mobile crane 18 (steps I to V)
measuring the pressures pFK1 to pFK4 (step VII)
calculating the set pressures pFK1SOLL to pFK4SOLL (step VIII)
correcting the pressures pFK1 to pFK4 as required (steps IX to XI)
checking the level (step XIII), repeating all steps if required The automatic control running in the control unit 14 carries out—after the start according to step I—first a check on the suspension height a of each individual spring circuit FK1 to FK4. In step II, set values are preset for the suspension heights a to be set for road travel. Then, in step III, in each of the spring circuits FK1 to FK4, the respective suspension height aFK1 to aFK4 in terms of an ACTUAL value are detected by means of the path measurement sensors W. In the following step IV the respectively detected suspension height aFK1 to aFK4 is compared with preset set values of suspension heights aFK1SOLL to aFK4SOLL. The suspension heights aFK1SOLL to aFK4SOLL correspond to the suspension heights to be achieved for road travel and therefore authorising road travel of the mobile crane 18. If for at least one of the suspension heights aFK1 to aFK4 the set value aFK1SOLL to aFK4SOLL is not achieved in the prescribed or preselected range, i.e. the result of the decision is 'No', in step V the suspension height a in each of the spring circuits FK1 to FK4, in which the set value has not yet been reached, is approached and set to the set values aFK1SOLL to aFK4SOLL permitted for travel operation. Then, the suspension height a for the spring circuits FK1 to FK4 is measured again (see step III). Now, the position of the lower carriage of the mobile crane 18 should be authorised for travel, i.e. the suspension height a in each of the spring circuits FK1 to FK4 corresponds to the preset set value aSOLL and the result of the decision in step IV is therefore 'Yes'. A deviation of about +/−4%, preferably of +/−2%, between set and actual values can be preselected as permissible in the comparison in order to exit the decision with the result 'Yes' going towards step VI.

In the next step VI, a delay is provided by a defined waiting time via a loop which is run through until a preset waiting time is reached. The waiting time is in the range of 1 ms to 2 s. This waiting time is necessary in order to avoid subsequently an erroneous measurement of the pressures pFK1 to pFK4 (see step VII) of each spring circuit FK1 to FK4 which would otherwise take place owing to the dynamics of the suspension movement after levelling.

After expiry of the defined waiting time, following the arrow with the result 'Yes', the respective ACTUAL values of the pressures pFK1 to pFK4 are detected in step VII with the aid of the respective pressure measurement sensors D in each of the spring circuits FK1 to FK4.

Since a suspension system with at least four spring circuits FK1 to FK4 is mathematically undetermined, the mutual influencing of the spring circuits FK1 to FK4 during setting of the desired suspension heights aFK1 to aFK4 for travel operation, even when assuming a central position of the overall centre of gravity of the suspended mass of the mobile crane 18 in relation to the eight wheels will hardly ever cause the same pressures pFK1 to pFK4 to arise since the undetermined system of equations forming the basis of the at least four spring circuits FK1 to FK4 comprises a multiplicity of solutions, of which only one will yield identical pressures pFK1 to pFK4. The detected pressures pFK1 to pFK4 are proportional to the wheel loads of the wheels 5. In this case it is to be considered that, in the hydraulic suspension, spring cylinders 6, 7 of different thicknesses are also used, i.e. the diameter, and therefore the effective cylinder surface, deviate from one another. These mutually different spring cylinders 6, 7 are used to make allowance for the mutually deviating unsuspended masses of the units formed by wheel 5 and respective axles 1 to 4. Non-steerable, steerable, driven and non-driven axles are used which have different intrinsic weights to one another. Thus the pressure pFK1 to pFK4 is not always directly proportional to the wheel load, but the wheel load corresponds to the product of pressure pFK1 to pFK4 and effective cylinder surface of the spring cylinder 6, 7, and therefore the load on the spring cylinder 6, 7 in addition to the proportion of the unsuspended masses of the unit formed by wheel 5 and axle 1 to 4. The pressure pFK1 to pFK4 is measured as the so-called actual pressure. The other parameters such as cylinder surfaces of the spring cylinders 6, 7 and unsuspended masses of the units formed by wheel 5 and respective axle 1 to 4, are device-specific and therefore stored as known variables in the control unit 14. With these details, the pressures pFK1 to pFK4 can then be used to determine the wheel load present in each case. The wheel loads present are used according to the present position of the overall centre of gravity (according to the measurement) to calculate the optimal wheel load distribution with the pressure (set pressure) required for this purpose.

After levelling to the desired suspension height aFK1 to aFK4, the distribution of the wheel loads is dependent on many boundary conditions. This distribution often takes place in a purely random manner so that an offset, i.e. an increase in the wheel loads, can occur on diagonally opposite spring circuits FK1 to FK4. This frequently results in the maximum permissible wheel loads being exceeded, which can be an accident risk in road traffic. On the basis of an axle load of 12 t which is permitted in Germany, a wheel load distribution can arise which, e.g. for the wheels 5 of the diagonally opposite spring circuits FK1 and FK3, amounts in each case to 7 t and, for the wheels of the two other, likewise diagonally opposite, spring circuits FK2 and FK4, amounts in each case to only 5 t. This state could lead to eight of the total of 16 wheels 5 being loaded with a wheel load which is above e.g. a permissible wheel load of a tyre of the wheels 5 of 6.5 t although the permissible axle load of 12 t per axle 1 to 4 has been respected. Although the detected pressures pFK1 to pFK4 in the present example with a central position for the overall centre of gravity have not arisen uniformly after the levelling for travel operation, the position of the overall centre of gravity and the overall weight of the mobile crane 18 can also be detected via this non-uniform pressure distribution. In knowledge of the device-specific data such as e.g. the cylinder surface of the respective spring cylinder 6, 7 and the unsuspended mass of the respective unit formed by wheel 5 and axles 1 to 4 an optimal distribution, i.e. one rendered uniform, of the pressures pFK1 to pFK4 or of the associated wheel loads is detected. In the present case of a central equilibrium position, a uniform pressure distribution to the individual spring circuits FK1 to FK4 is preset or calculated for the pressure set values of pFK1 to pFK4. The sum of the wheel loads from the now differently distributed pressures corresponds to the sum of the wheel loads corresponding to the previously detected unevenly distributed pressures pFK1 to pFK4. By means of the additional boundary condition of the equilibrium position and the overall sum of the wheel loads it is then possible, in terms of a clear solution, to calculate an optimal pressure distribution in step VIII. Only by means of the additional conditions for the uniform wheel load distribution and the measured pressures of the individual spring circuits FK1 to FK4 is the spring system statically determined and has a defined solution. For the case where the detected pressures pFK1 to pFK4 indicate, by their mutually different absolute values, an off-centre position of the overall centre of gravity can this be determined arithmetically therefrom and also the more uniform wheel load distribution linked thereto. Since the wheel load distribution is proportional to the pressures in the spring circuits FK1 to FK4 it is possible to calculate a clear distribution of the pressures pFK1 to pFK4 on the spring circuits FK1 to FK4. The calculated pressures pFK1 to pFK4 are always closer to each other than those arising previously in the undetermined system. In the case of an overall centre of gravity shifted to one side of the mobile crane 18 it is therefore possible for the result of a calculation to be a wheel load distribution of 6.3 t for each right wheel 5 and 5.7 t for each left wheel 5.

As a further example, a four-wheeled mobile crane 18 is assumed, having a central overall centre of gravity and an overall weight of 24 t. After levelling is completed, a wheel load on the mutually diagonal wheels 5 of 7 t each and for the remaining two wheels 5 of 5 t each is established by reason of twisting. After wheel load optimisation in accordance with the invention the wheel load on all four wheels 5 is 6 t each. With this wheel load optimisation an attempt is made to achieve the smallest possible difference between the forces present at every one of the wheels 5.

Thus the optimal wheel load distribution to be achieved does not mean that each spring circuit FK1 to FK4 experiences the same loading or the same pressure p. It is much rather the case that, as described above, in dependence upon the loading and the position of an overall centre of gravity of the suspended mass of the mobile crane 18 a load distribution is selected wherein all spring circuits FK1 to FK4 experience the theoretically most uniform loading. Thus all wheels are loaded and a difference in the wheel loads is only as high as also arises from the overall centre of gravity.

A calculation of the pressures pFK1 to pFK4 in terms of pressure set values is effected under the prescribed boundary conditions in step VIII.

In step IX, the measure load distribution in the form of the pressures pFK1 to pFK4 is compared with the calculated—in terms of an optimised and more uniform—wheel load distribution in dependence upon the loading condition of the mobile crane 18 in the form of the pressures pFK1SOLL to pFK4SOLL. If the desired distribution of the wheel loads is not found, then in the following step X on the 'No' path of decision IX, setting or adjustment of the pressures pFK1 to pFK4 of the spring circuits FK1 to FK4 is provided until the pressure set values pFK1SOLL to pFK4SOLL are achieved, which at most permit a deviation from the calculated optimal values of +/−4%, preferably of +/−2%. Then, in step XI and therefore before step IX, the pressure values pFK1 to pFK4 are measured once more and then step IX is repeated. The comparison of the pressure values pFK1 to pFK4 with the pressure set values pFK1SOLL to pFK4SOLL should now lead to the desired wheel load distribution which is more uniform because it is adapted to the pressure set values. In the case of a positive outcome of this comparison, the decision is exited at 'Yes' and then, in a further step XII, measurement of the suspension heights a is carried out again in order to then check, in step XIII, whether the suspension heights a and therefore the level of the mobile crane 18 are authorised for travel, i.e. correspond to the set values aFK1SOLL to aFK4SOLL. In this case, for the detected suspension heights a a tolerance range of +/−4% is permitted. If the outcome of this measurement is negative, the process beginning prior to step II must be repeated. In the case of a positive outcome of the decision in step XIII the wheel loads of the mobile crane 18 are optimised for road travel and the control method is concluded at step XIV.

In conjunction with the above-described flow diagram of a method for automatically controlling a hydropneumatic suspension with optimal wheel load distribution for travel operation of the mobile crane 18 it is required that the mobile crane 18 is standing on even or relatively even ground 16. However, this is a known requirement in level adjustment using hydropneumatic suspension.

Furthermore, the term unsuspended masses of the units formed by wheel 5 and respective axles 1 to 4 in conjunction with the present invention is more precisely to be understood to be a proportion of the unsuspended mass per wheel side which is allocated to the respective wheel 5. In detail, this is composed of the sum of: proportion of the mass of the axles 1 to 4 per wheel 5 (in the case of a symmetrical axle it is half the axle weight; in the case of a single wheel suspension it is the mass thereof), proportion of the add-on parts on the axle per wheel 5 (e.g. steering cylinder, brake cylinder, lines, attachment means thereof, etc.), weight of the wheel 5 (consisting of tyres, rim, bolts, etc.), proportion of the unsuspended axle suspension per wheel 5, proportion of the unsuspended mass of the spring cylinders 6, 7, proportion of the unsuspended drive elements per wheel 5 (e.g. steering shafts) and proportion of the unsuspended mechanical steering linkage per wheel 5. In the case of components which constitute a connection between the unsuspended axles 1 to 4 (wheel side) and the chassis frame 15, the mass thereof is to be divided into a suspended and an unsuspended portion.

In the present case, the invention is described with the aid of a hydropneumatic suspension system having four spring circuits FK1 to FK4. It is self-evident that more than 4 spring circuits can also be provided. In the case of e.g. 6 spring circuits, i.e. an even number of spring circuits per mobile crane side, more equations are to be solved in a corresponding manner in order to arrive at the optimised wheel load distribution. It is also self-evident that the mobile crane 18 can also comprise—in addition to eight wheels 5 and four axles 1—a higher or lower number of wheels 5 and axles 1 which can then be allocated in a suitable manner to the spring circuits FK1 to FK4. In this case, one to seven wheels are provided per spring circuit FK1 to FK4. The smallest number of axles 1 is then correspondingly two. Mobile cranes 18 with individual wheel suspension without corresponding axles are also known. The method is also applicable in this case.

The invention claimed is:

1. A method for controlling a hydropneumatic suspension of a mobile crane having at least four wheels which are each allocated a spring cylinder, and having at least four spring circuits in which at least one spring cylinder is incorporated in each case, with each spring circuit being allocated a pressure measurement sensor and a path measurement sensor, said method comprising:
    processing signals of the pressure measurement sensors and of the path measurement sensors by a control unit and actuating the spring cylinders;
    leveling the mobile crane for road travel operation of the mobile crane using preset suspension height set values of the spring circuits;

calculating pressure set values per spring circuit in the control unit on the basis of the pressures detected by the pressure measurement sensors; and readjusting the pressures in the spring circuits with the aid of the pressure set values;

wherein calculating the pressure set values of the spring circuits comprises calculating the pressure set values with knowledge of the position of the overall center of gravity of the mobile crane and of the overall weight of the mobile crane; and wherein calculating the pressure set values of the spring circuits comprises distributing the sum of the detected pressures of the spring circuits to the calculated pressure set values of the spring circuits.

2. The method as claimed in claim 1, wherein in order to level the mobile crane suspension heights of the spring circuits detected by the path measurement sensors are regulated to the associated suspension height set values of the spring circuits.

3. The method as claimed in claim 2, further comprising calculating the position of the overall center of gravity of the mobile crane and the overall weight of the mobile crane with the control unit using the pressures of the spring circuits.

4. The method as claimed in claim 1, further comprising calculating the position of the overall center of gravity of the mobile crane and the overall weight of the mobile crane with the control unit using the pressures of the spring circuits.

5. The method as claimed in claim 1, wherein readjusting the pressures in the spring circuits with the aid of the pressure set values comprises readjusting the pressures in the spring circuits using the pressure set values with a tolerance of at most+/−4%.

6. The method as claimed in claim 5, wherein readjusting the pressures in the spring circuits with the aid of the pressure set values comprises readjusting the pressures in the spring circuits using the pressure set values with a tolerance of at most+/−2%.

7. A method for controlling a hydropneumatic suspension of a mobile crane having at least four wheels which are each allocated a spring cylinder, and having at least four spring circuits in which at least one spring cylinder is incorporated in each case, with each spring circuit being allocated a pressure measurement sensor and a path measurement sensor, said method comprising:

processing signals of the pressure measurement sensors and of the path measurement sensors by a control unit and actuating the spring cylinders;

leveling the mobile crane for road travel operation of the mobile crane using preset suspension height set values of the spring circuits;

calculating pressure set values per spring circuit in the control unit on the basis of the pressures detected by the pressure measurement sensors; and readjusting the pressures in the spring circuits with the aid of the pressure set values;

wherein readjusting the pressures in the spring circuits with the aid of the pressure set values comprises readjusting the pressures in the spring circuits using the pressure set values with a tolerance of at most+/−4%.

8. The method as claimed in claim 7, wherein readjusting the pressures in the spring circuits with the aid of the pressure set values comprises readjusting the pressures in the spring circuits using the pressure set values with a tolerance of at most+/−2%.

9. The method as claimed in claim 7, wherein in order to level the mobile crane suspension heights of the spring circuits detected by the path measurement sensors are regulated to the associated suspension height set values of the spring circuits.

10. The method as claimed in claim 7, further comprising calculating the position of the overall center of gravity of the mobile crane and the overall weight of the mobile crane with the control unit using the pressures of the spring circuits.

11. The method as claimed in claim 7, wherein calculating the pressure set values of the spring circuits comprises calculating the pressure set values with knowledge of the position of the overall center of gravity of the mobile crane and of the overall weight of the mobile crane.

* * * * *